United States Patent
Rajagopalan et al.

(10) Patent No.: US 10,148,614 B2
(45) Date of Patent: Dec. 4, 2018

(54) METHODS, SYSTEMS, AND COMPUTER READABLE MEDIA FOR APPLYING A SUBSCRIBER BASED POLICY TO A NETWORK SERVICE DATA FLOW

(71) Applicant: Oracle International Corporation, Redwood Shores, CA (US)

(72) Inventors: Sundaram Rajagopalan, Waltham, MA (US); Apirux Bantukul, Cary, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 166 days.

(21) Appl. No.: 15/221,565

(22) Filed: Jul. 27, 2016

(65) Prior Publication Data
US 2018/0034770 A1    Feb. 1, 2018

(51) Int. Cl.
*H04L 29/12*    (2006.01)
*H04L 12/14*    (2006.01)
(Continued)

(52) U.S. Cl.
CPC ...... *H04L 61/2571* (2013.01); *H04L 12/1407* (2013.01); *H04L 12/4633* (2013.01);
(Continued)

(58) Field of Classification Search
None
See application file for complete search history.

(56) References Cited

U.S. PATENT DOCUMENTS 9,572,037 B2* 2/2017 Puri ............... H04W 12/12
2002/0181448 A1* 12/2002 Uskela ............. H04L 29/12009
370/352
(Continued)

FOREIGN PATENT DOCUMENTS

WO    WO 2013/094920 A1    6/2013

OTHER PUBLICATIONS

Notification of Transmittal of the International Search Report and the Written Opinion of the International Searching Authority, or the Declaration for International Application No. PCT/US2017/042682 (dated Sep. 29, 2017).

*Primary Examiner* — Thomas J Dailey
(74) *Attorney, Agent, or Firm* — Jenkins, Wilson, Taylor & Hunt, P.A.

(57) ABSTRACT

Methods, systems, and computer readable media for applying a subscriber based policy to a network service data flow are disclosed. According to one example, the method includes determining, based on message traffic communicated between a user equipment device and an operator network via GTP, a private socket address that identifies the user equipment device and conducting network address translation (NAT) on a spoofed Internet protocol (IP) protocol data unit (PDU) that includes the private socket address in order to derive a corresponding public socket address. The method further includes provisioning, in a network element positioned in the operator network, a mapping record that correlates the private socket address to the public socket address, and utilizing, by the network element, the mapping record to apply at least one subscriber-based policy to received service data flow associated with the user equipment device.

17 Claims, 5 Drawing Sheets

(51) Int. Cl.
*H04L 12/46* (2006.01)
*H04L 12/24* (2006.01)
*H04L 12/813* (2013.01)
*H04L 29/06* (2006.01)

(52) U.S. Cl.
CPC .......... *H04L 41/0806* (2013.01); *H04L 47/20* (2013.01); *H04L 61/2567* (2013.01); *H04L 63/02* (2013.01); *H04L 63/0236* (2013.01)

(56) References Cited

U.S. PATENT DOCUMENTS

| | | | |
|---|---|---|---|
| 2003/0081607 A1* | 5/2003 | Kavanagh ........... | H04L 63/0227 370/392 |
| 2005/0201304 A1* | 9/2005 | Olshansky ............ | H04L 65/104 370/282 |
| 2009/0168697 A1* | 7/2009 | Zabawskyj ............. | H04L 12/14 370/328 |
| 2014/0075538 A1* | 3/2014 | Im ....................... | H04L 63/1483 726/13 |
| 2014/0269740 A1 | 9/2014 | Garneij et al. | |
| 2014/0325091 A1* | 10/2014 | Hong ....................... | H04L 67/14 709/245 |
| 2015/0181592 A1* | 6/2015 | Bindrim ................ | H04W 24/02 370/329 |
| 2016/0072930 A1* | 3/2016 | Shi ....................... | H04W 28/065 370/392 |
| 2016/0080260 A1* | 3/2016 | Wang ................... | H04L 67/025 370/392 |
| 2016/0192235 A1* | 6/2016 | Ahluwalia .............. | H04L 69/22 370/329 |

* cited by examiner

IMSI::IP Address Mapping Table

402

| IMSI | IIP | EIP (post NATed IIP) |
|---|---|---|
| 310012123456789 | 10.11.12.13 | 18.5.1.13 |
| 310014122226487 | 10.11.12.14 | 19.15.7.19 |
| 310023496791644 | 10.11.12.15 | 19.2.45.74 |

IIP::EIP Address Mapping Table

404

| IIP | EIP of UE | Internal port | External port of UE | DIP | Destination port |
|---|---|---|---|---|---|
| 10.11.12.13 | 18.5.1.3 | 7601 | 1701 | 174.129.2.58 | 80 |
| 10.11.12.14 | 19.15.7.19 | 4567 | 5678 | 8.8.8.8 | 53 |
| 10.11.12.15 | 19.2.45.74 | 9809 | 8096 | 216.58.218.206 | 80 |

FIG. 4

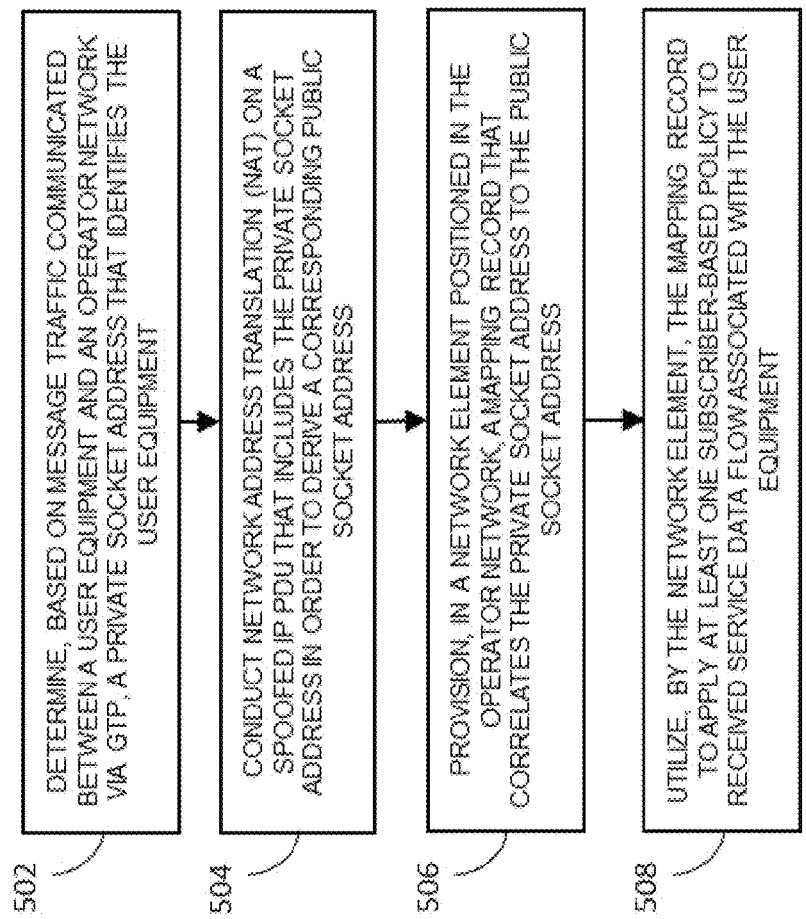

METHODS, SYSTEMS, AND COMPUTER READABLE MEDIA FOR APPLYING A SUBSCRIBER BASED POLICY TO A NETWORK SERVICE DATA FLOW

TECHNICAL FIELD

The subject matter described herein relates to customer flow management and manipulation. More specifically, the subject matter relates to methods, systems, and computer readable media for applying a subscriber based policy to a network service data flow.

BACKGROUND

In IP-based operator networks, end hosts such as wireless user equipment (UE) or wired customer premises equipment (CPE) are typically assigned and granted private Internet protocol (IP) addresses. While the assignment of private IP addresses does solve complications associated with the allocation and use of the limited network addresses designated to existing operator networks and Internet service providers (ISPs), it does introduce several other problematic networking issues. For example, with the increasing need for customer flow manipulation and monetization, network operators require an effective way to associate a network service data flow with a subscriber user and/or application. While there are some solutions in the telecommunication vendor ecosystem that are able to provide network address translation functionality, it can be problematic to procure this information within the policy ecosystem.

Accordingly, a need exists for methods, systems, and computer readable media for applying a subscriber based policy to a network service data flow.

SUMMARY

Methods, systems, and computer readable media for applying a subscriber based policy to a network service data flow are disclosed. According to one method for applying a subscriber based policy to a network service data flow, the method includes determining, based on message traffic communicated between a user equipment device and an operator network via general packet radio service tunneling protocol (GTP), a private socket address that identifies the user equipment device and conducting network address translation (NAT) on a spoofed Internet protocol (IP) protocol data unit (PDU) that includes the private socket address in order to derive a corresponding public socket address. The method further includes provisioning, in a network element positioned in the operator network, a mapping record that correlates the private socket address to the public socket address, and utilizing, by the network element, the mapping record to apply at least one subscriber-based policy to received service data flow associated with the user equipment device.

According to one system for applying a subscriber based policy to a network service data flow, the system includes a policy charging and rules function (PCRF) configured to determine, based on message traffic communicated between a user equipment device and an operator network via GTP, a private socket address that identifies the user equipment device and to generate a spoofed IP PDU that includes the private socket address. The system also includes a network address translator configured to receive the spoofed IP PDU and to conduct NAT on the spoofed IP PDU that includes the private socket address in order to derive a corresponding public socket address. The system further includes a network element positioned in the operator network that is configured to receive a mapping record generated by the PCRF that correlates the private socket address to the public socket address and to utilize the mapping record to apply at least one subscriber-based policy to received service data flow associated with the user equipment device.

According to one non-transitory computer readable medium for applying a subscriber based policy to a network service data flow, the non-transitory computer readable medium includes computer executable instructions that are embodied in the computer readable medium that when executed by a processor of a computer control the computer to perform steps that comprises determining, based on message traffic communicated between a user equipment device and an operator network via GTP, a private socket address that identifies the user equipment device and conducting NAT on a spoofed IP PDU that includes the private socket address in order to derive a corresponding public socket address. The method further includes provisioning, in a network element positioned in the operator network, a mapping record that correlates the private socket address to the public socket address, and utilizing, by the network element, the mapping record to apply at least one subscriber-based policy to received service data flow associated with the user equipment device.

The subject matter described herein may be implemented in software in combination with hardware and/or firmware. For example, the subject matter described herein may be implemented in software executed by a processor. In some implementations, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 4 is a diagram illustrating exemplary mapping record tables according to an embodiment of the subject matter described herein; and FIG. 5 is a diagram illustrating a process for applying a subscriber based policy to a network service data flow according to an embodiment of the subject matter described herein.

DETAILED DESCRIPTION

The subject matter described herein relates to methods, systems, and computer readable media for applying a subscriber based policy to a network service data flow. At present, network operators require an effective method to associate a traffic flow with a subscriber and/or an application. In some embodiments, the disclosed subject matter addresses this problem via the utilization of a private-IP:: global-IP mapping (e.g., a private socket address::public socket address mapping) associated with a subscriber's user equipment device. Notably, the disclosed subject matter may employ a mechanism that utilizes IP spoofing and enables a network operator to significantly increase the scope of policy solutions in the operator network. As used herein, a policy may refer to any policy rule that may be applied to a service data flow, such as a policy charging control (PCC) rule or a software-defined network (SDN) related rule. For example, by providing the visibility of a private IP:public IP mapping onto a policy platform, IP-based PCC rules can effectively be pushed from the policy platform to a core operator network, thereby reducing the network operator's capital and operational expenses on hardware elements (e.g., DPI gear and/or components), which are typically expensive and difficult to maintain.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
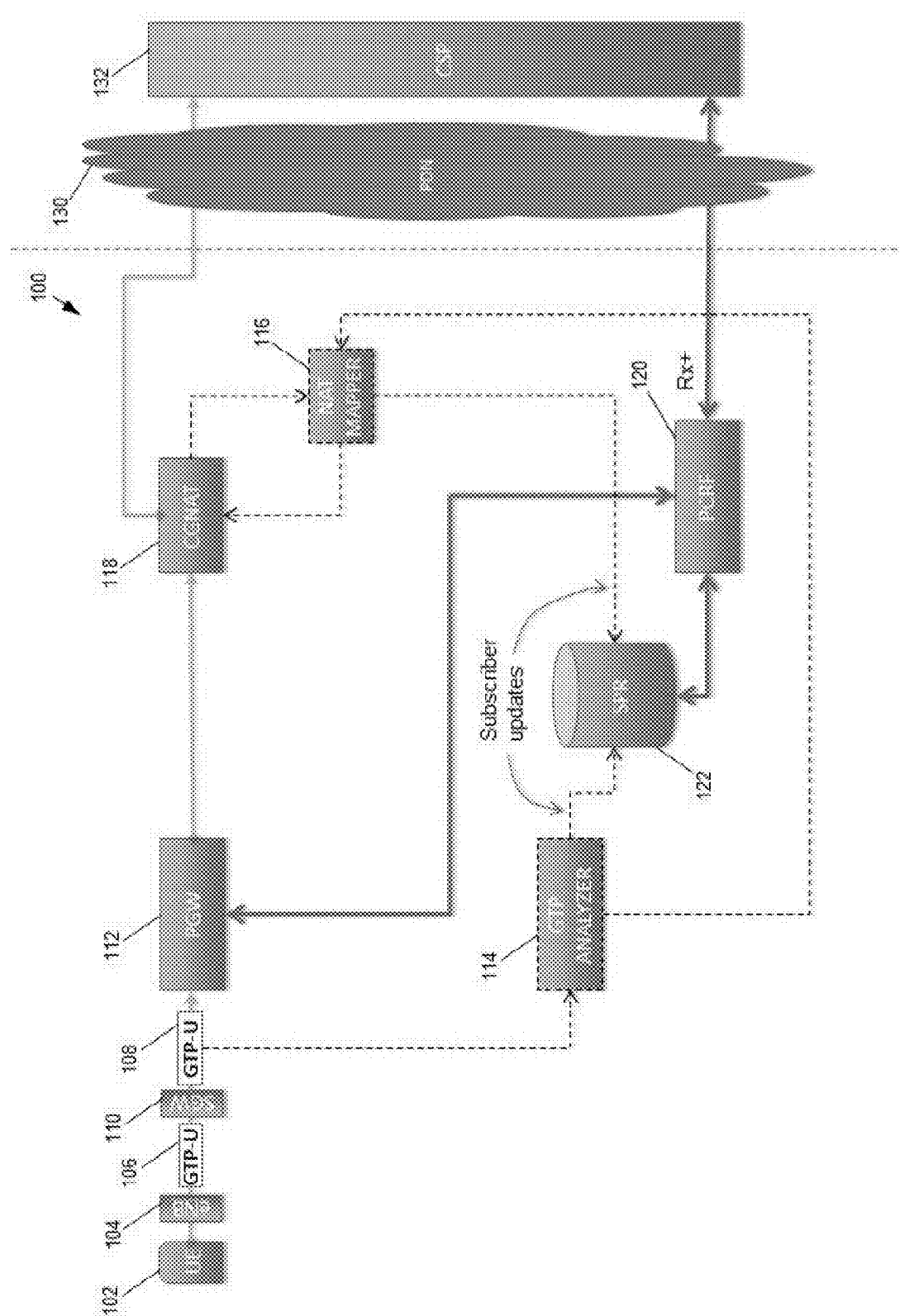
FIG. 1 is a diagram illustrating a network architecture for applying a subscriber based policy to a network service data flow according to an embodiment of the subject matter described herein.

FIG. 1 is a block diagram illustrating a core operator network 100 according to an embodiment of the subject matter described herein. Referring to FIG. 1, network 100 may include user equipment device 102, an evolved Node B (eNodeB) 104, a service gateway (SGW) 110, a packet gateway (PGW) 112, a general packet radio service tunneling protocol (GTP) analyzer 114, a network address translation (NAT) mapper 116, a carrier grade network address translation (CGNAT) translator 118, and policy and charging rules function (PCRF) 120, a subscriber profile repository (SPR) 122, a packet data network (PDN) 130, and a content service provider (CSP) 132. As used herein, the abbreviated term "NAT" may refer to both network address translation and/or network address and port translation (NAPT) without departing from the scope of the present subject matter.

In some embodiments, user equipment device 102 (e.g., also known as "user equipment" or "UE") may represent a user device, such as a mobile handset, for communicating with one or more elements of network 100. For example, user equipment device 102 may include a computer, a pager, a smartphone, a phone, a wireless modem, a hotspot, a computing platform, a mobile handset, and other subscriber device.

User equipment device 102 may be configured to communicate with eNodeB 104. The eNodeB 104 may be located within an access network (not shown). An access network may include nodes, functions, devices, and/or components for providing user equipment device 102 access to services, functions, or devices in one or more networks (e.g., PDN 130). For example, an access network may include a radio access network (RAN) or other access network, such as a Global System for Mobile Communications (GSM) RAN (GRAN), a GSM enhanced data rates for GSM evolution (EDGE) RAN (GERAN), a general packet radio service (GPRS) access network, a universal mobile telecommunications system (UMTS) RAN (UTRAN), an evolved UTRAN (eUTRAN), an Internet protocol (IP) connectivity access network (IP CAN), a code division multiple access (CDMA) network, an Evolution-Data Optimized (EV-DO), a wideband CDMA (WCDMA) network, a High Speed Packet Access (HSPA) network, or an evolved HSPA (eH-SPA+) network.

In some embodiments, eNodeB 104 may perform radio access functions for connecting user equipment device 102 with various communications networks and/or nodes. The eNodeB 104 may communicate with one or more nodes located within network 100. For example, eNodeB 104 may be configured to communicate messages (e.g., attachment, authentication, and/or mobility related messages) to PGW 112 and/or PCRF 120 within the network 100.

SGW 110 may comprise any serving gateway that facilitates communication between user equipment device 102 and PGW 112. In particular, SGW 110 may include a first interface that is configured to facilitate communication with the mobility management entity (not shown) that supports user equipment device 102 and a second interface that facilitates a communicative connection to PGW 112.

SPR 122 may comprise any physical or logical entity that serves as a centralized repository system where subscriber profile data can provisioned. SPR 122 may be provisioned with subscriber updates that include mapping information by GTP analyzer 114 and NAT mapper 116 in the manner described below. Further, SPR 122 may provide update notifications to, and be accessible by, PCRF 120.

Network 100 may include a core operator network for providing UE related services. For example, a core operator network may perform network aggregation, charging, and authentication functions for user equipment device 102. In some embodiments, a core operator network may be at least one of a 3G network, a 3G+ network, a GSM network, a 4G network, an LTE network, an evolved packet core (EPC) network, a 3GPP network, a GPRS core operator network, or other network.

In some embodiments, network 100 may include a 3GPP network (e.g., an EPS or an LTE network) for providing user equipment related services. In this example, the 3GPP network nay include PGW 112, PCRF 120, SPR 122, and other nodes not shown, such as, a Diameter relay agent and/or a Diameter signaling router (DRA/DSR), a mobility management entity (MME), a home subscriber server (HSS), an authentication, authorization, and accounting (AAA) server, and a bearer binding and event reporting function (BBERF).

PGW 112 may be any suitable entity for communicating with PDN 130 and/or other related node. For example, PGW 112 may include functionality for communicating between networks, e.g., a 3GPP core operator network and PDN 130. In some embodiments, PGW 112 may include a policy and charging enforcement function (PCEF) and may manage and enforce policy and charging control (PCC) rules provided by PCRF 120. For example, rules may be provided for each service data flow (e.g., one or more packet flows that match certain criteria, such as a subscriber-based media traffic flow) and/or user equipment device 102 attempting to use PGW 112. In this example, PGW 112 may control access to external networks and charge for such access based on policy rules received from PCRF 120 (e.g., via an IP-CAN session). PGW 112 may also include or communicatively connected to CGNAT translator 118. As shown in FIG. 1, PGW 112 and CGNAT translator 118 are depicted as separate entities. In such an example, CGNAT translator 118 may reside in any other network element (e.g., a router device, a firewall device, etc.) residing in core operator network 100. Alternatively, PGW 112 and CGNAT translator 118 may be co-located in a single device or component (e.g., CGNAT translator function residing in PGW 112). As used herein, CGNAT translator 118 may include any function or device that is configured to perform NAT or NAPT processing for core operator network 100.

In some embodiments, PCRF 120 may be any suitable entity or device for creating, selecting, or otherwise determining policies (e.g., one or more PCC rules). For example, PCRF 120 may include a policy and charging rules function (PCRF) and may be a stand-alone node, e.g., a policy server or a multimedia policy engine (MPE), or may be co-located or integrated with one or more nodes in network 100, e.g., a DRA/DSR. PCRF 120 may include and/or access storage (e.g., a policy and/or software-defined network (SDN) information database) for determining 3GPP policy information and SDN policy information. For example, a database may contain associations between private socket addresses (or private socket address:public socket address mappings) and policy information for 3GPP and SDN related networks. In this example, the database may store PCC rules and/or SDN related rules with a session identifier (e.g., a Diameter Gx session identifier and/or UE IP address) associated with user equipment device 102. In some embodiments, PCRF 120 may include one or more communications interfaces for communicating policy related messages, e.g., via a Gx interface, Gxx interface, Sp interface, an extensible markup language (XML) interface, a session initiation protocol (SIP) interface, a SOAP interface, or a hypertext transfer protocol (HTTP) interface or others. For example, a Gx interface may be used for sending policy related messages between PCRF 120 and PGW 112.

In some embodiments, PCRF 120 may include functionality (e.g., software executing on processor(s)) for generating and/or providing policy information associated with a user equipment device and/or a 3GPP session. For example, PCRF 120 may retrieve, generate, and/or provide PCC rules for a given 3GPP session (e.g., service data flow) associated with user equipment device 102. For example, a PCC rule may include a rule name, service identifier, service data flow (SDF) filter(s), precedence information, gate status, QoS parameters, charging key (i.e., rating group), other charging parameters, and/or monitoring key. The rule name or PCC rule identifier may be used to reference a PCC rule in the communication between a PCEF (e.g., hosted by PGW 112) and PCRF 120 and may be unique for each PCC rule used during a 3GPP (e.g., IP connectivity access network (IP-CAN)) session. The service identifier may be used to identify the application service or the service component to which the service data flow relates. The SDF filter(s) may be used to select the traffic (e.g., IP PDUs) for which the rule applies. For example, an SDF filter make take the form of an IP tuple specifying the private socket address that corresponds to a unique subscriber user device.

In some embodiments, network 100 includes GTP analyzer 114 and a NAT mapper 116. Although depicted as separate entities in FIG. 1, GTP analyzer 114 and NAT mapper 116 may reside and be incorporated into a common host computing device or platform. In some embodiments, GTP analyzer 114 may be configured to analyze message traffic, such as IP PDUs, that are communicated in GTP tunnels established between a network PGW and the eNodeB supporting a subscriber user equipment device. In particular, the GTP analyzer 114 may be configured to analyze GTP control plane (GTP-C) and GTP user plane (GTP-U) traffic to detect and extract subscriber session related information including, but not limited to, international mobile subscriber identifier (IMSI) information, private socket address information, IMSI::private socket address mapping information, tunnel endpoint identifier (TEID) information, access point name (APN) information, E-UTRAN Cell Global Identifier (ECGI) information, timing advance (TA) information, and the like. As used herein, the private socket address may comprise a private IP address, such as an internal IP (IIP) address or a subscriber IP (SIP) address and its corresponding port identifier (e.g., IIP:port44). GTP analyzer 114 may also be configured to subsequently utilize the TEID information to obtain private socket address (e.g., an internal IP (IIP) address and associated port identifier) and destination socket address (e.g., destination IP (DIP) address and associated port identifier) mappings (e.g., <IIP:portA, DIP1:portB>). After GTP analyzer 114 analyzes and obtains the subscriber session information from the GTP traffic, GTP analyzer 114 may be configured to provide the mapping information to an SPR for storage as a subscriber profile update.

Further, NAT mapper 116 may be configured to generate a spoofed IP PDU that includes a private socket address provided by GTP analyzer 114. NAT mapper 116 may be further configured to forward the spoofed IP PDU to a CGNAT translator 118 for network address and port translation processing. Depending on the embodiment, CGNAT translator 118 may be positioned on any network element residing in the core operator network 100.

In some embodiments, GTP analyzer 114 and NAT mapper 116 may, individually or collectively, comprise a special purpose computing device or machine that includes hardware components (e.g., one or more processor units, memory, and network interfaces) configured to execute software elements (e.g., applications, software modules, etc.) for the purposes of performing one or more aspects of the disclosed subject matter herein. In addition, it should be noted that GTP analyzer 114 and/or NAT mapper 116 and its components and functionality described herein may constitute a special purpose computer that improves the technological field pertaining to NAT translations by providing mechanisms for spoofing and utilizing a private socket address to maintain the designation of a service data flow to a particular subscriber user. Although not shown in FIG. 1, GTP analyzer 114 and NAT mapper 116 may, individually or collectively, include one or more processor(s), memory, and data storage. For example, the processor(s) may include a physical or hardware implemented processor for executing software or executable instructions and the memory may include a non-transitory computer readable medium for storing executable instructions or software. In this example, the processor(s) may execute software and/or executable code stored in the memory.

In some embodiments, PDN 130 may be a data network and may provide various services and/or data to user equipment device 102, e.g., via one or more intermediary nodes. In some embodiments, PDN 130 may include a public network, such as the Internet, and/or a private network. PDN 130 may utilize one or more various mechanisms for prioritizing traffic and/or routes and/or for providing different QoS for traffic communicated between user equipment device 102 and CSP 132. Notably, CSP 132 in FIG. 1 may represent any host server or entity that is configured to provide an application service (e.g., via service data flows) to a requesting user equipment device.

Referring to FIG. 1, user equipment device 102 may initiate an attachment procedure for the purposes of establishing a session (e.g., service data flow) with an over the top CSP 132. For example, user equipment device 102 may initially establish a wireless radio connection with eNodeB 104 in order to communicate an attach request message. The eNodeB 104 forwards the attach request message to an MME (not shown), which in turn generates a session request that is sent to PGW 112 via SGW 110. Notably, GTP tunnels 106-108 are established between eNodeB 104, SGW 110, and PGW 112 as the requested session is established. In particular, GTP tunnels 106 and 108 are constructed and configured to communicate message traffic (e.g., IP PDUs) between user equipment device 102 and PGW 112 via SGW 110. After the default bearer of the requested session is established, GTP analyzer 114 may be configured to analyze GTP-C traffic and GTP-U traffic traversing the GTP tunnels. In some embodiments, network 100 may include a performance intelligence (PIC) platform (not shown) that can be configured to capture and analyze network traffic data (e.g., GTP traffic, IP traffic, etc.) in real time. For example, a PIC platform can reside in one or more switches in network 100 and may be configured to employ a port mirroring technique that forwards a copy of network traffic to GTP analyzer 114 for inspection and further analysis (as described below). In particular, GTP analyzer 114 may inspect GTP traffic (e.g., GTP-C traffic) to obtain subscriber session information such as, IMSI private socket address mapping information, TEID information, AP) information, ECGI information, TA information, and the like. Further, GTP analyzer 114 may subsequently utilize the TEID information to obtain private socket address and destination socket address mappings (e.g., <IIP:portA, DIP1:portB>). After GTP analyzer 114 analyzes and obtains the GTP information, GTP analyzer 114 may be configured to provide the mapping information to SPR 122 for storage as a subscriber profile update. Examples of the stored mapping information is described below and illustrated in FIG. 4.

In some embodiments, GTP analyzer 114 may be configured to "push" the private socket address information to NAT mapper 116 for further processing. For example, GTP analyzer 114 may generate a spoofed IP PDU (e.g., a spoofed packet) that includes the private socket address and may subsequently forward the generated spoofed IP PDU to NAT mapper 116 to trigger a network address translation discovery process.

Upon receiving the spoofed IP PDU, NAT mapper 116 utilizes the private socket address (e.g., IIP:port1 or SIP: port1) to designate a local IP interface, which is provided to CGNAT translator 118. In some examples, CGNAT translator 118 may be configured to perform network address translation processing on the local IP interface (e.g., a private socket address) to derive and/or generate a public IP interface (e.g., a public socket address). For example, CGNAT translator 118 may receive a spoofed IP PDU that includes address information indicative of a private socket address of 10.11.12.13:4545 (e.g., IIP=10.11.12.13 and port identifier=4545) and conduct a network address translation function on the private socket address that results in establishing a public socket address of 18.5.1.13:6783 (e.g., EIP=18.5.1.13 and port identifier=6783).

In some embodiments, CGNAT translator 118 subsequently forwards the discovered/translated public socket address information to NAT mapper 116, which then creates a mapping record that correlates the private socket address to the public socket address (e.g., [10.11.12.13:4545:: 18.5.1.13:6783]). NAT mapper 116 then forwards the mapping record as a subscriber profile update to SPR 122.

After storing the received mapping record, SPR 122 may be configured to send an update notification message to PCRF 120. PCRF 120, in turn, requests the mapping record (along with any other subscriber profile update information) and provisions its subscriber based policy databases. Notably, PCRF 120 may be configured to obtain the mapping record from SPR 122 in order to update subscriber policies to be executed and applied to service data flows communicated in network 100. For example, PCRF 120 may forward the mapping record and one or more associated subscriber policies to PGW 112 (e.g., via a Gx interface). Upon receipt, PGW 112 may begin applying appropriate subscriber specific policy to any service data flow that includes the public socket address (e.g., the EIP address and port number). In some embodiments, policies may be applied by PGW 112 onto a service data flow on a subscriber specific basis via the use of a subscriber identifier (e.g., an IMSI) with or without the use of the private IP address associated with the subscriber. For example, the PGW 112 may be configured to apply IMSI specific policies (e.g., a specific service/policy tier that is assigned to the IMSI) to a service data flow communicated over a bearer associated with a subscriber's IMSI.

It will be appreciated that FIG. 1 is for illustrative purposes and that various nodes, their locations, and/or their functions may be changed, altered, added, or removed. For example, some nodes and/or functions may be combined into a single entity (e.g., a SPR 122 and PCRF 120 may be integrated).

Figure 2:
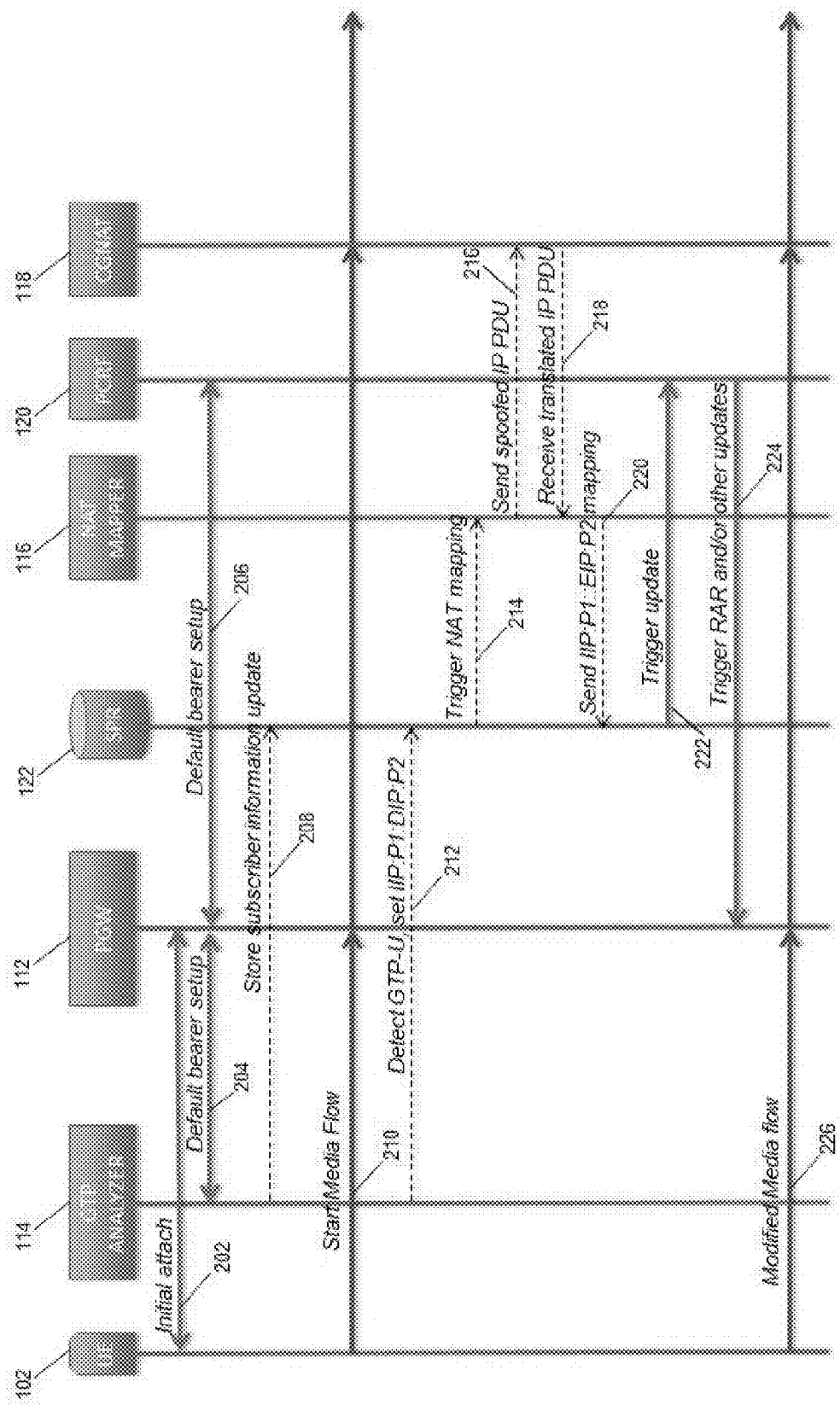
FIG. 2 is a diagram illustrating a call flow signaling diagram for applying a subscriber based policy to a network service data flow according to an embodiment of the subject matter described herein.

FIG. 2 is a diagram illustrating a call flow signaling diagram for applying a subscriber based policy to a network service data flow according to an embodiment of the subject matter described herein. As shown in FIG. 2, user equipment device 102 may conduct an initial attachment procedure 202 and consequently establishes one or more GTP tunnels. Notably, a default bearer setup 204 using GTP tunneling is established between user equipment device 102 and PGW 112. As the GTP tunnels are being established, GTP analyzer 114 sets up subscriber related information to be associated with the GTP tunnels, such as an IMSI::IPv4 address mapping, a TEID, and the like (as described above with respect to FIG. 1). Further, a default bearer setup 206 is established at this time between PGW 112 and PCRF 120. GTP analyzer 114 subsequently stores the established subscriber related information in SPR 122 as a subscriber profile update (see 208). Examples of the stored subscriber related information is described below and illustrated in FIG. 4. A media flow 210 (e.g., a service data flow associated with a requested application service) communicated between user equipment device 102 and an over the top CSP entity (not shown) is also established.

At 212, GTP analyzer 114 may be configured to detect and analyze the IP PDUs (e.g., GTP-U PDUs and/or GTP-C PDUs) traversing the GTP tunnels for various subscriber data. In some embodiments, GTP analyzer 114 may extract subscriber identifier information from the message traffic (e.g., IP PDUs) communicated via the GTP tunnels to establish an IP address subscriber mapping. For example, GTP analyzer 114 may be configured to use the private internal IP address/port information (i.e., private socket address) of the subscriber's user equipment device and the public destination IP address/port information of the subscriber's destination endpoint to generate an IP address mapping, e.g., <IIP:Port1::DIP:Port2>. This mapping information may be stored by GTP analyzer 114 in SPR 122 for future reference and/or use. After the subscriber mapping information is stored in SPR 122, SPR 122 may forward the private socket address to NAT mapper 116 to initiate a NAT mapping and/or discovery operation (see 214). In some alternate embodiments, GTP analyzer 114 may acquire the private socket address associated with a particular subscriber's use equipment device from the PDUs and forwards the private socket address to NAT mapper 116 to trigger a NAT mapping and/or discovery process.

Upon receiving the private socket address, NAT mapper 116 may generate and send a spoofed IP PDU to CGNAT translator 118 (see 216). Notably, NAT mapper 116 creates and sends a PDU that indicates that the PDU originates from user equipment device 102 (e.g., the PDU includes the private socket address of user equipment device 102). Thus, NAT mapper 116 generates the PDU in order to spoof itself as the user equipment device 102. Notably, this spoofing causes CGNAT translator 118 to be deceived in a manner such that CGNAT translator 118 is unable to determine that NAT mapper 116 is the true originator of the spoofed PDU including the private socket address (e.g., IIP:Port1).

Upon receiving and processing the spoofed PDU, CGNAT translator 118 sends a translated IP PDU, which includes the public socket address (e.g., EIP:Port2) for the user equipment device 102, back to NAT mapper 116 (see 218). In response, NAT mapper 116 may create a mapping record that correlates the private socket address to the public socket address (e.g., IIP:Port1::EIP:Port2). After the mapping record is generated, NAT mapper 116 may send the mapping record to SPR 122 for storage as a subscriber profile update (see 220).

After receiving the mapping record, SPR 122 may send a notification update message 222 to PCRF 120. In response, PCRF 120 may then send a re-authorization request (RAR) message 224 to PGW 112 along with any applicable subscriber policy updates via a Gx interface. For example, PCRF 120 may send one or more PCC rules (or updated rules) that correspond to the subscriber associated with the recently provisioned/received mapping record. Notably, a PCEF hosted by PGW 112 may be configured to apply the one or more PCC rules to a service data flow (e.g., PDUs) on a per-subscriber basis. In particular, PGW 112 and/or PCEF may be configured to utilize the mapping record to identify PDUs in a service data flow that originate from, or are destined to, a particular subscriber's user equipment device. PGW 112 and/or PCEF may then apply one or more policies to the identified service data flow based on the corresponding PCC rules received from PCRF 120. The service data flow that is subjected to the one or more subscriber-based policies is shown as a modified media flow 226.

Figure 3:
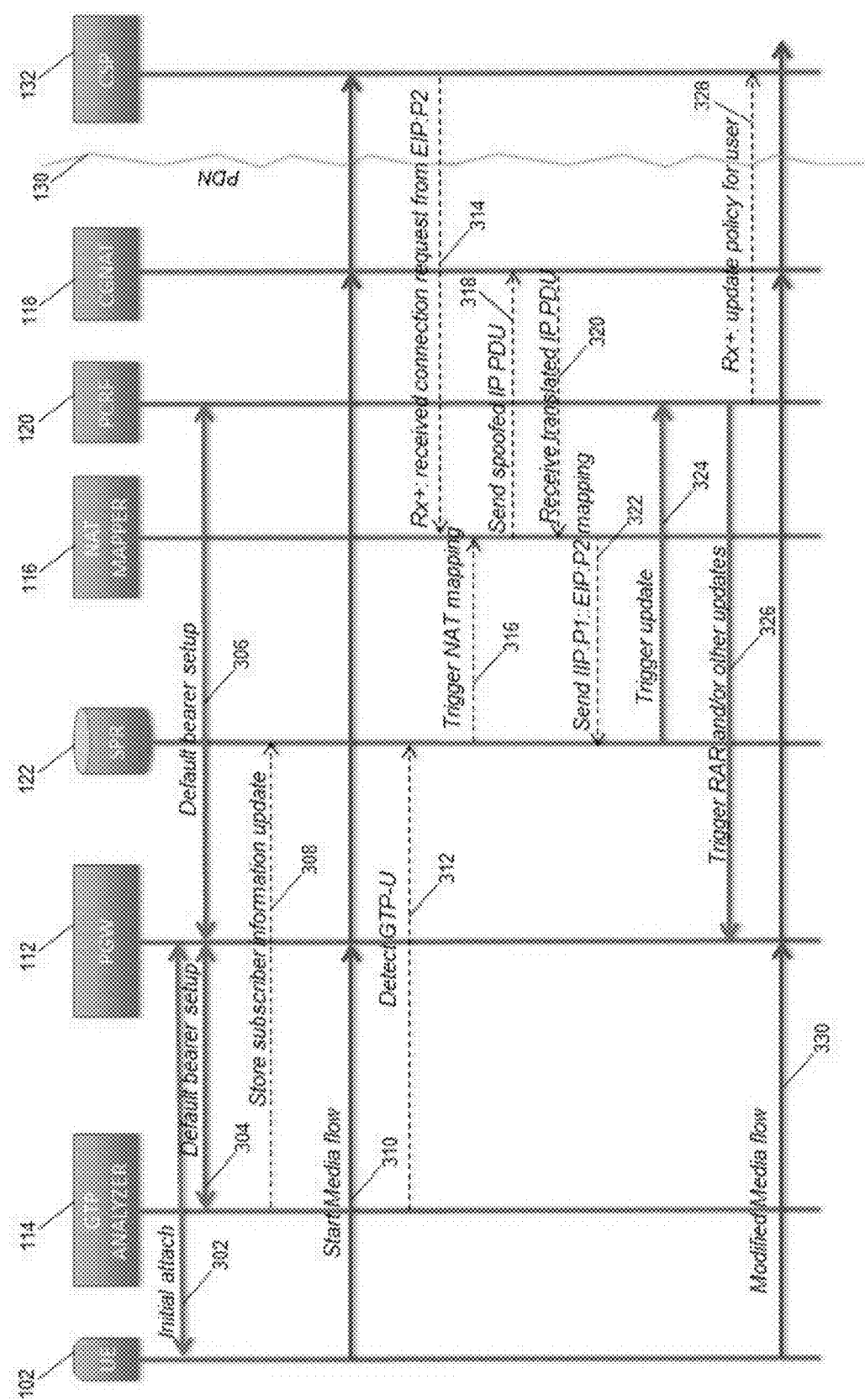
FIG. 3 is a diagram illustrating a call flow signaling diagram for applying a subscriber based policy to a network service data flow with support from a content service provider according to an embodiment of the subject matter described herein.

FIG. 3 is a diagram illustrating a call flow signaling diagram for applying a subscriber based policy to a network service data flow with support from an over the top content service provider according to an embodiment of the subject matter described herein. As shown in FIG. 3, user equipment device 102 may conduct an initial attachment procedure 302 and consequently establishes one or more GTP tunnels. Notably, a default bearer setup 304 using GTP tunneling is established between user equipment device 102 and PGW 112. As the GTP tunnels are being established, GTP analyzer 114 sets up subscriber related information to be associated with the GTP tunnels, such as an IMSI::IPv4 address mapping, a TEID, and the like (as described above with respect to FIG. 1). Further, a default bearer setup 306 is established at this time between PGW 112 and PCRF 120. GTP analyzer 114 subsequently stores the established subscriber related information in SPR 122 as a subscriber profile update (see 308). A media flow 310 (e.g., a service data flow, such as video streaming data) communicated between user equipment device 102 and an over the top CSP 132 is also established. Notably, media flow 310 is facilitated by PGW 112, which sends the media data flow from an external socket address of EIP::Port2.

At 312, GTP analyzer 114 may be configured to detect and analyze the GTP-U PDUs and GTP-C PDUs traversing the GTP tunnels for subscriber identifiers and data. In some embodiments, GTP analyzer 114 may extract subscriber identifier information from the message traffic (e.g., IP PDUs) communicated via the GTP tunnels to establish an IP address subscriber mapping. For example, GTP analyzer 114 may be configured to use the private internal IP address/port information (i.e., private socket address) of the subscriber's user equipment device and the public destination IP address/port information of the subscriber's destination endpoint to generate an IP address mapping, e.g., such as <IIP:Port1::DIP:Port2>. This mapping information may be stored by GTP analyzer 114 in SPR 122 for future reference and/or use.

In some embodiments, NAT mapper 116 may receive an acknowledgment message 314 from CSP 132 via an Rx interface that indicates that a connection request was received from PGW 112 via EIP:Port 2 (e.g., media flow 310).

After storing the subscriber mapping information in SPR 122 as indicated above at step 312, GTP analyzer 114 may forward the private socket address portion to NAT mapper 116 to initiate a NAT mapping and/or discovery operation (see 316). In particular, GTP analyzer 114 may acquire a private socket address associated with a particular subscriber (e.g., corresponding to user equipment device 102) from the PDUs and subsequently forwards the private socket address to NAT mapper 116 to trigger a NAT mapping and/or discovery process.

Upon receiving the private socket address, NAT mapper 116 may generate and send a spoofed IP PDU to CGNAT translator 118 (see 318). Notably, NAT mapper 116 creates and sends a PDU that indicates that the PDU originates from user equipment device 102 (e.g., the PDU includes the private socket address of user equipment device 102). Thus, NAT mapper 116 generates the PDU in order to spoof itself as the user equipment device 102. Notably, this spoofing causes CGNAT translator 118 to be deceived in a manner such that CGNAT translator 118 is unable to determine that NAT mapper 116 is the true originator of the spoofed PDU including the private socket address (e.g., IIP:Port1).

Upon receiving and processing the spoofed PDU, CGNAT translator 118 sends an translated IP PDU, which includes the public socket address (e.g., EIP:Port2) corresponding to user equipment device 102, back to NAT mapper 116 (see 320). In response, NAT mapper 116 may create a mapping record that correlates the private socket address to the public socket address that is recognized by CSP 132 (e.g., IIP:Port1::EIP:Port2). After the mapping record is generated, NAT mapper 116 may send the mapping record to SPR 122 for storage as a subscriber profile update (see 322).

After receiving the mapping record, SPR 122 may send a notification update message 324 to PCRF 120. In response, PCRF 120 may then send a re-authorization request (RAR) message 326 to PGW 112 along with any applicable subscriber policy updates via a Gx interface. For example, PCRF 120 may send one or more PCC rules (e.g., updated PCC rules) that correspond to the subscriber associated with the recently provisioned/received mapping record and user equipment device 102. Notably, a PCEF (not shown) hosted by PGW 112 may be configured to apply the one or more PCC rules to a service data flow (e.g., PDUs) traversing PGW 112 on a per-subscriber basis. In particular, PGW 112 and/or PCEF may be configured to utilize the mapping record to identify PDUs in a service data flow that originate from, or are destined to, a particular subscriber's user equipment (e.g., user equipment device 102). PGW 112 and/or PCEF may then apply one or more policies to the identified service data flow based on the corresponding PCC rules received from PCRF 120. The service data flow that is subjected to the one or more subscriber-based policies is shown as a modified media flow 330.

In addition to providing PGW 112 with the one or more PCC rules as indicated above, PCRF 120 may also be configured to send an update message 328 to CSP 132 via an Rx interface. In some embodiments, message 328 includes one or more policies (or policy updates) which can be used by CSP 132 to apply to service data flows pertaining to a particular subscriber user (e.g., associated with user equipment device 102).

As indicated above, FIG. 4 is a diagram illustrating exemplary mapping record tables according to an embodiment of the subject matter described herein. FIG. 4 depicts exemplary mapping tables that may be maintained by SPR 122. In particular, FIG. 4 includes an IMSI::IP address mapping table 402 that may be embodied as a database structure. Table 402 may include a plurality of entries that respectively comprises an IMSI column, an IIP column, and EIP column. In particular, the IMSI column, the IIP column, and EIP column respectively contains IMSI data, the IIP data, and EIP data corresponding to each of a plurality subscriber user equipment devices. In some embodiments, the data contained in the entries of table 402 may be provisioned by GTP analyzer 114 after GTP analyzer 114 obtains the IMSI, IIP, and EIP data from analyzed GTP tunnels supporting communications between a particular user equipment device and a CSP endpoint.

FIG. 4 includes an IIP::EIP address mapping table 404 that may similarly be embodied as a database structure. Table 404 may include an IIP column, an EIP column, an internal port column, an external port column, a DIP column, and a destination port column. In particular, the IIP column, the EIP column, the internal port column, and the external port column, respectively contains the IIP data, the EIP data, data representative of the internal port corresponding to the IIP, and data representative of the external port of the user equipment corresponding to each of a plurality subscriber user equipment devices. Further, the DIP column and destination port column respectively include the DIP data and associated destination port number that corresponds to the CSP endpoint in which the user equipment has established a service data flow. In some embodiments, the data contained in the entries of table 404 may be provisioned by NAT mapper 116 after NAT mapper 116 generates a mapping record subsequent to obtaining the EIP and external port data from CGNAT translator 118. In particular, NAT mapper 116 may forward the mapping record including the mapping of the private socket address (e.g., <IIP:Internal Port>) to the translated public socket address (e.g., <EIP:External Port.) to SPR 122. SPR 122 may utilize the mapping information to generate a new entry (or update and existing entry) in table 404.

FIG. 5 is a diagram illustrating a process 500 for applying a subscriber based policy to a network service data flow according to an embodiment of the subject matter described herein. In step 502, a private socket address that identifies a user equipment device is determined. Notably, the determination of the private socket address is based on message traffic communicated by the user equipment device via GTP. In some embodiments, a GTP analyzer is configured to analyze the IP PDUs that are communicated via GTP tunnels communicatively connecting the user equipment device to the PGW.

In step 504, network address translation is conducted on a spoofed IP PDU, which includes the private socket address. In some embodiments, the GTP analyzer forwards the private socket address to the NAT mapper, which in turn generates a spoofed IP PDU that includes the private socket address. The spoofed IP PDU is subsequently sent by the NAT mapper to the CGNAT translator for address translation processing. The CGNAT translator then translates the private socket address to derive a corresponding public socket address.

In step 506, a mapping record that correlates the private socket address to the public socket address is provisioned in a network element positioned in the operator network. In some embodiments, the NAT mapper may be configured to generate a mapping record that maps/correlates the user equipment device's private socket address to the user equipment device's public socket address. The mapping record is then sent by the NAT mapper to the SPR, where the mapping record is stored within. A PCRF may then access the SPR and use the mapping record to provision and/or update a PGW (or any other network element in the operator network) with the private socket address and public socket address mapping data (e.g., IIP:Port1::EIP:Port2).

In step 508, the mapping record is utilized, by the network element, to apply at least one subscriber-based policy to a service data flow associated with the user equipment device. In some embodiments, the PGW is able to utilize the mapping record to apply a policy to a service data flow, such as a multimedia traffic flow, communicated between the subscriber user equipment device and a CSP.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method comprising:
   determining, based on message traffic communicated between a user equipment device and an operator network via general packet radio service tunneling protocol (GTP), a private socket address that identifies the user equipment device;
   conducting network address translation (NAT) on a spoofed Internet protocol (IP) protocol data unit (PDU) that includes the private socket address in order to derive a corresponding public socket address, wherein the spoofed IP PDU is generated by a GTP analyzer;
   provisioning, in a network element positioned in the operator network, a mapping record that correlates the private socket address to the public socket address; and utilizing, by the network element, the mapping record to apply at least one subscriber-based policy to received service data flow associated with the user equipment device.

2. The method of claim 1 wherein the network element includes at least one of: a packet gateway, a firewall device, or a router device.

3. The method of claim 1 wherein determining the private socket address includes analyzing the message traffic that is communicated via at a user plane or a control plane of an at least one established GTP tunnel utilized by the user equipment device to obtain the private socket address.

4. The method of claim 1 wherein the public socket address is determined by a network address translator that is either co-located with a packet gateway or positioned externally from a packet gateway in the operator network.

5. The method of claim 1 wherein the mapping record is stored in a subscriber profile repository (SPR) and subsequently obtained from the SPR and sent to the network element by a policy and charging rules function (PCRF).

6. The method of claim 1 wherein the network address translator is a carrier grade network address translation (CGNAT) function or device.

7. A system comprising:
a policy and charging rules function (PCRF) device including a processor and a memory and configured to determine, based on message traffic communicated between a user equipment device and an operator network via general packet radio service tunneling protocol (GTP), a private socket address that identifies the user equipment device and is associated with a GTP analyzer that generates a spoofed Internet protocol (IP) protocol data unit (PDU) that includes the private socket address;
a network address translator device configured to receive the spoofed IP PDU and to conduct network address translation (NAT) on the spoofed IP PDU that includes the private socket address in order to derive a corresponding public socket address; and
a network element positioned in the operator network that is configured to receive a mapping record generated by the PCRF device that correlates the private socket address to the public socket address and to utilize the mapping record to apply at least one subscriber-based policy to received service data flow associated with the user equipment device.

8. The system of claim 7 wherein the network element includes at least one of: a packet gateway, a firewall device, or a router device.

9. The system of claim 7 wherein the PCRF device is further configured to analyze the message traffic that is communicated via at a user plane or a control plane of an at least one established GTP tunnel utilized by the user equipment device to obtain the private socket address.

10. The system of claim 7 wherein the public socket address is determined by a network address translator that is either co-located with a packet gateway or positioned externally from a packet gateway in the operator network.

11. The system of claim 7 wherein the mapping record is stored in a subscriber profile repository (SPR) and subsequently obtained from the SPR and sent to the network element by the PCRF device.

12. The system of claim 7 wherein the network address translator device is a carrier grade network address translation (CGNAT) device.

13. A non-transitory computer readable medium comprising computer executable instructions embodied in the computer readable medium that when executed by a processor of a computer control the computer to perform steps comprising:
determining, based on message traffic communicated between a user equipment device and an operator network via general packet radio service tunneling protocol (GTP), a private socket address that identifies the user equipment device;
conducting network address translation (NAT) on a spoofed Internet protocol (IP) protocol data unit (PDU) that includes the private socket address in order to derive a corresponding public socket address, wherein the spoofed IP PDU is generated by a GTP analyzer;
provisioning, in a network element positioned in the operator network, a mapping record that correlates the private socket address to the public socket address; and
utilizing, by the network element, the mapping record to apply at least one subscriber-based policy to received service data flow associated with the user equipment device.

14. The non-transitory computer readable medium of claim 13 wherein the network element includes at least one of: a packet gateway, a firewall device, or a router device.

15. The non-transitory computer readable medium of claim 13 wherein determining the private socket address includes analyzing the message traffic that is communicated via at a user plane or a control plane of an at least one established GTP tunnel utilized by the user equipment device to obtain the private socket address.

16. The non-transitory computer readable medium of claim 13 wherein the public socket address is determined by a network address translator that is either co-located with a packet gateway or positioned externally from a packet gateway in the operator network.

17. The non-transitory computer readable medium of claim 13 wherein the mapping record is stored in a subscriber profile repository (SPR) and subsequently obtained from the SPR and sent to the network element by a policy and charging rules function (PCRF).

* * * * *